United States Patent
Dooley et al.

(10) Patent No.: US 7,027,488 B2
(45) Date of Patent: Apr. 11, 2006

(54) SPREAD SPECTRUM RECEIVER AND RELATED METHOD

(75) Inventors: Saul R. Dooley, Reigate (GB); Andrew T. Yule, Felbridge (GB); Martin S Wilcox, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 677 days.

(21) Appl. No.: 10/003,058

(22) Filed: Nov. 2, 2001

(65) Prior Publication Data

US 2002/0039381 A1    Apr. 4, 2002

(30) Foreign Application Priority Data

Nov. 4, 2000    (GB) ................................ 0026982

(51) Int. Cl.
*H04B 1/69*    (2006.01)
(52) U.S. Cl. ................ 375/147; 375/136; 375/150; 375/152
(58) Field of Classification Search ................ 375/147, 375/136, 150, 152; 701/213, 220
See application file for complete search history.

(56) References Cited

U.S. PATENT DOCUMENTS

| | | | | |
|---|---|---|---|---|
| 5,862,511 A | * | 1/1999 | Croyle et al. | 701/213 |
| 5,901,171 A | * | 5/1999 | Kohli et al. | 375/147 |
| 6,289,041 B1 | * | 9/2001 | Krasner | 375/152 |
| 6,532,419 B1 | * | 3/2003 | Begin et al. | 701/220 |

FOREIGN PATENT DOCUMENTS

| | | |
|---|---|---|
| DE | 19727867 C | 12/1998 |
| EP | 0528530 A1 | 2/1993 |
| EP | 0903951 A2 | 3/1999 |
| GB | 2305825 A | 4/1997 |

* cited by examiner

*Primary Examiner*—Shuwang Liu

(57) ABSTRACT

A method and apparatus for receiving a spread spectrum signal at a mobile communications terminal, including the step of processing the signal for the purposes of signal acquisition and signal tracking, monitoring movement of the mobile terminal and deriving a signal indicative of a characteristic of movement of the mobile terminal, and further including changing the mode of the processing of the incoming spectrum signal in response to the signal indicating the said characteristic of movement of the mobile terminal.

14 Claims, 1 Drawing Sheet

SPREAD SPECTRUM RECEIVER AND RELATED METHOD

FIELD OF THE INVENTION

The present invention relates to an apparatus and related method of receiving a spread spectrum signal at a mobile communications terminal, including the steps of processing the signal for the purposes of signal acquisition and for signal tracking and also having means for monitoring movement of the mobile terminal and deriving a signal indicative of a characteristic of movement of the mobile terminal.

BACKGROUND OF THE INVENTION

Spread spectrum communication techniques are widely employed in a variety of fields one of which includes the currently known Global Positioning Systems (GPS) employed for obtaining accurate positional information of a receiving device on the basis of signals received from a constellation of GPS satellites.

The GPS arrangement is employed particularly for tracking the position of objects that move over the surface of the earth, for example, vehicles, and is also increasingly being employed in an attempt to accurately locate mobile communication devices such as mobile telephones.

The mere fact that the object to be located can comprise a vehicle such as a car, or indeed a mobile communication device being carried within the vehicle, introduces additional design constraints on the GPS receiver employed since the degree of such relative movement between the receiver and each GPS satellite will introduce a Doppler shift into the frequency of the signal received from the satellite. Since, as part of the signal processing procedure within the receiver, the frequency of the incoming signal has to be accurately determined, this can introduce a severe processing overhead. Thus, current GPS receivers tend to be designed to cater for a "worst case scenario". For example, for a receiver designed for use in a conventional motor car, which can readily achieve surface speeds of 100 miles per hour (i.e. 45 m/s) this can lead to a potential Doppler shift of the received signal of up to 200 Hz depending on the direction of travel of the motor car relative to the incoming signal.

The signal processing within the GPS receiver is therefore designed to cater for such a potential shift in the incoming frequency. However, such functionality can prove disadvantageously restrictive when the particular movement characteristics of the vehicle do not, or are unlikely to, lead to such a frequency shift.

EP-A-0,528,530 discloses a GPS navigation system employing selective updating in which a signal indicative of the vehicle within which a receiver is sensed being stationary is derived. When generated, this signal serves to prevent further signal processing within the receiver so that previously acquired positional information can be retained for repeated use since the vehicle is known not to have moved since its position was last calculated.

Such a known system is however disadvantageously limited particularly in as much as it relies upon the accuracy of the previous signal reading obtained when the vehicle was last moving.

The present invention seeks to provide for a spread spectrum receiver and related method which can offer improvements over known systems with regard to improved signal processing within the receiver.

According to one aspect of the present invention there is provided a method of the type defined above, characterised by the step of changing the mode of processing of the incoming spread spectrum signal responsive to generation of the signal indicating the said characteristic of movement of the mobile terminal.

According to another aspect of the present invention there is provided a spread spectrum receiver of the type defined above, characterised by means for changing the mode of processing of the incoming spectrum signal in response to the signal indicating the said characteristic of movement of the mobile terminal.

In one aspect of the invention, a readily determinable movement characteristic can be employed for controlling the mode of processing of the incoming spread spectrum signal in a manner for improving the performance of the receiver and thus the GPS in which it is employed.

In still other aspects of the invention, further advantageous movement characteristic can be determined and employed in combination with a threshold velocity value so as to provide for a threshold at which the processing mode can be switched in accordance with the present invention. In still other aspects of the invention, a stationery, i.e. zero velocity, movement characteristic is identified since the greatest improvement in performance within the receiver can then be readily attained. In still other aspects of the invention, the signal tracking aspects of the processing of the incoming spread spectrum signal have greatly improved stability and weaker signals can be tracked successfully.

BRIEF DESCRIPTION OF THE DRAWINGS

The invention is described further hereinafter, by way of example only, with reference to the accompanying drawings in which.

DETAILED DESCRIPTION OF THE INVENTION

Figure 1:
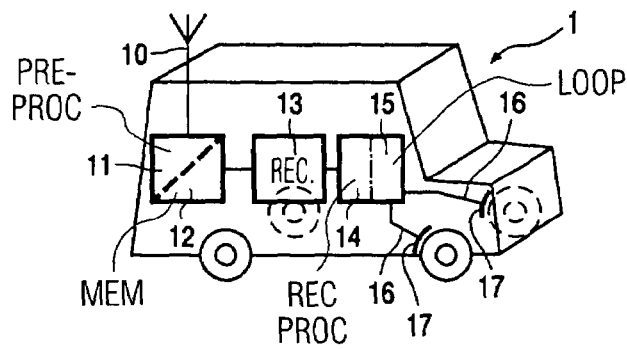
FIG. 1 is a schematic representation of a vehicle when employing a GPS receiver according to an embodiment of the present invention.

FIG. 1 illustrates a vehicle in the form of a van 1 having a GPS receiver arrangement mounted thereon which comprises an antenna 10, pre-processor 11, memory unit 12, parallel receiver channels 13, receiver processor 14 including signal tracking loops 15, a signal line 16 connected to an odometer arrangement 17 within the vehicle so as to supply a control signal via the signal line 16 to the control loops 15.

Figure 2:
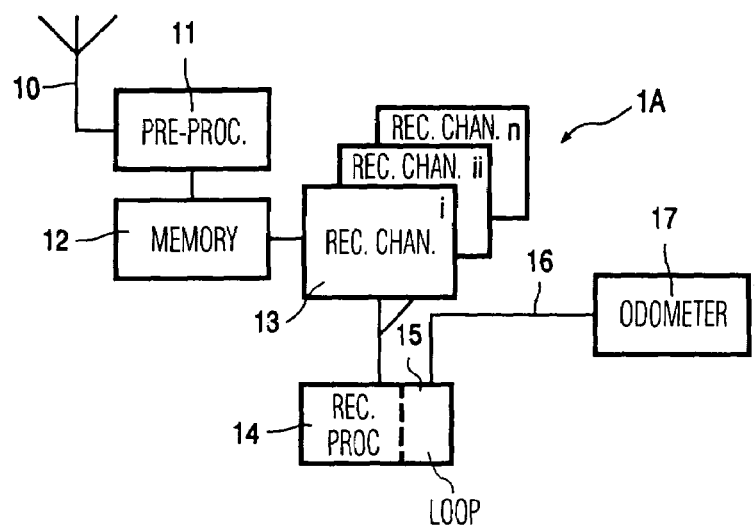
FIG. 2 is a schematic representation of the GPS receiver of FIG. 1.

The functional arrangement of the GPS receiver according to an embodiment of the present invention is now described further with reference to FIG. 2.

FIG. 2 shows, schematically, the architecture of a GPS receiver 1A according to the present invention. NAVSTAR SPS GPS signals are received by an antenna 10 and pre-processed in a pre-processor 11; typically by passive band-pass filtering in order to minimise out-of-band RF interference, preamplification, down conversion to an intermediate frequency (IF) and analog to digital conversion. The resultant, digitised if signal remains modulated, still containing all the information from the available satellites, and is fed into a memory 12 (termed taking a "snapshot"). From the memory 12, the samples may be fed at any time later into each of a series of parallel receiver channels 13. The use of the memory 12 is not essential for automotive GPS receivers and so the if signal could alternatively be fed directly into the receiver 13. The satellite signals are acquired and tracked in respective digital receiver channels in co-operation with the receiver processor 14 for the purpose of acquiring pseudo range information. Such methods for acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006793-7 Artech House. Using acquired pseudo range information and the time of arrival of the transmissions, the navigation processor 18 calculates the position of the receiver using conventional algorithms and that position is displayed on a display 19 to the user.

The tracking loops 15 within the receiver processor 14 are designed to follow the carrier frequency of the incoming spread spectrum signals and the characteristics of such loops tend to be determined by a balance between the maximum rate of frequency change that can be tolerated, and their ability to smooth-out noise components within the signals. This relationship dictates that, the more tolerant the control loops are to high rates of frequency change, the greater will be each loop's susceptibility to noise components and so the less stable the loops will prove to be. In accordance with the illustrated embodiment of the present invention, a plurality of control loops are provided so that the mode of processing within the receiver processor 14 can be switched between processing employing a default set of signal tracking loops and a selectable set of loops selected for operation in response to an appropriate control signal on the signal line 16 from the vehicle odometer 17. The default set of signal tracking loops would generally employ a standard set of loops arranged to tolerate accelerations of, for example, 2 g which is approximately equivalent to a rate of frequency shift of 100 Hz/s. The selectable set of control loops need only cope with, for example, a relatively slow change in Doppler shift which is indicated by the signal obtained on the signal line 16. As will be appreciated, the odometer 17 can be arranged to deliver a control signal via signal line 16 only in instances when the vehicle is stationery, when the vehicle is travelling below a threshold speed or, as an alternative, an accelerometer can be employed in place of the odometer 17 so as to deliver a control signal by way of the signal line 16 only when the vehicle achieves a constant speed and so does not experience any acceleration. In the latter case, the selectable set of signal tracking loops need only cope with the relatively slow change in Doppler shift caused by the motion of the GPS satellites and the rotation of the earth which is likely to be in the region of 1 Hz/s. Since, in this instance, the selectable signal tracking loops are designed only to cope with such a relatively small rate of change of Doppler shift, the ability of the selectable signal tracking loops to smooth out noise is much greater and so vastly improved performance within the GPS receiver can be obtained which allows for improved stability and the tracking of much weaker signals than currently occurs.

Where a memory store is utilised, the incoming signals may be processed whereby a snapshot of the GPS data is only taken when either the speed or acceleration of the mobile terminal is below a predetermined threshold.

Thus, through a determination that the vehicle is not accelerating, or is indeed stationary, the performance of the GPS receiver can be enhanced such that, while continuing the signal processing procedure whilst the vehicle is determined to be in a non-acceleration, or stationary, mode, the performance can be improved.

Figure 3:
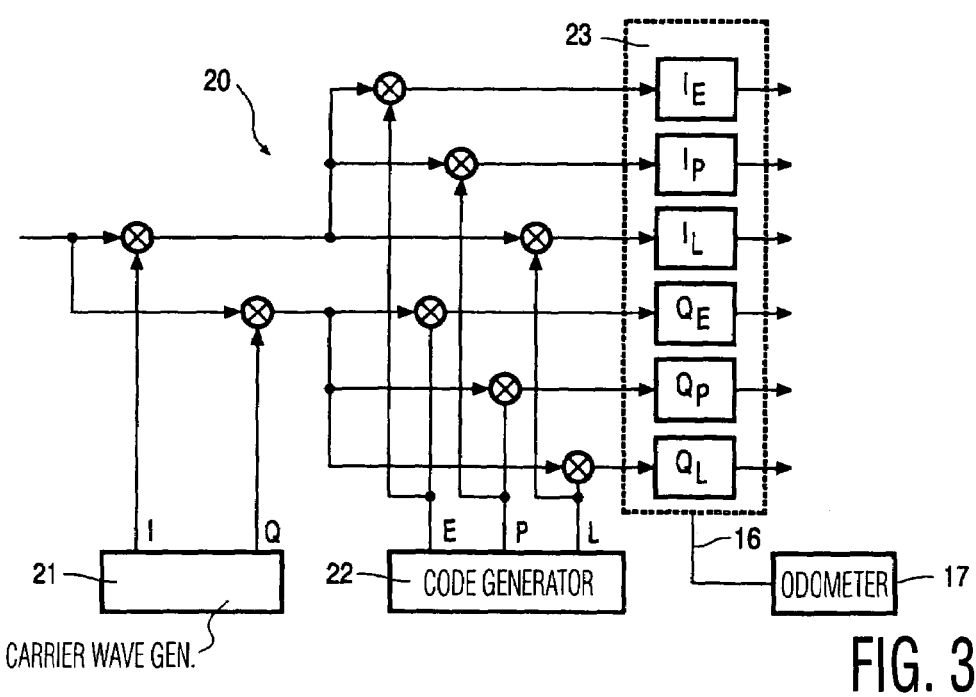
FIG. 3 is a schematic representation of one of the receiver channels illustrated with reference to FIG. 2.

FIG. 3 shows, schematically, an embodiment of a receiver channel 20 such as that 13 of FIG. 1 co-operating with the receiver processor in greater detail. In order to retrieve pseudo range information from the signal samples stored in the memory 12, a carrier wave must be removed and this is done by the receiver generating in-phase (1) and quadrature phase (Q) replica carrier wave signals using a carrier wave generator 21. A carrier wave phase lock loop (PLL) is normally employed to accurately replicate the frequency of the received carrier wave. In order to acquire code phase lock, early (E), prompt (P) and late (L) replica codes of the PRN sequences are continuously generated by a code generator 22. The replica codes are then correlated with the I and Q signals to produce three in-phase correlation components ($I_{E1}$, $I_{L1}$ $I_P$) and three quadrature phase correlation components ($Q_{E1}$ $Q_{L1}$ $Q_P$), typically by integration in an integrator 23 over substantially the whole of the PRN code. In the receiver processor 14, a code phase discriminator is calculated as a function of the correlation components and a threshold test applied to the code phase discriminator. A phase match is declared if the code phase discriminator is high and if not, the code generator produces the next series of replicas with a phase shift. A linear phase sweep will eventually result in the incoming PRN code being in phase with that of the locally generated replica and thus code acquisition.

The pre-processor 11 will be typically implemented in the form of front end analogue circuitry with the digital receiver channels 13, the receiver processor 14 and the navigation processor 15 implemented in the form of a general purpose microprocessor or a microprocessor embedded in a GPS application specific integrated circuit (ASIC).

FIG. 3 also shows the vehicle odometer 17 and signal line 16 illustrated in FIG. 2 and which signal line 16 connects to the integrator 23 so as to provide a control signal thereto.

In accordance with the illustrated embodiment of the present invention, the integrator 23 is arranged to exhibit a selectable integration time which is in fact arranged to be determined responsive to the incoming signal on the signal line 16.

Again, the characteristic of movement monitored by the odometer 17 can comprise the speed of the vehicle and in particular identifying a speed below a threshold value and generally close to zero, the determination that the vehicle is actually stationary, or the employment of an accelerometer in place of, or in addition to, the odometer 17 so as to determine whether or not the vehicle is in a state of acceleration/deceleration.

It should be appreciated that the ability of the GPS receiver to detect a weak signal is limited by the integration time within the integrator 23 which is, in turn, limited by the stability of the signal, that is the maximum rate of change of frequency thereof. If the receiver is not in a state of acceleration/deceleration, then it is envisaged that integration periods of up to 1 s can be employed. In contrast, in the standard situation in which acceleration/deceleration values of 2 g must be tolerated as noted above, integration times within the integrated 23 above 10 ms cannot generally be achieved. It is further determined that an integration period of 1 s can be employed to detect a signal that is 20 dB weaker than could be detected by operating within an integration time of 10 ms.

Thus, the signal line 16 indicative of a particular movement characteristic of the mobile terminal such as a state of non-acceleration/deceleration, or indeed a state of non-movement, can serve to increase the integration time within the integrator 23 up to, for example, a value of 1 s so that, while in this stationary, or non accelerating/decelerating state, the GPS receiver can operate to receive weaker signals than would otherwise be possible so that, as described above in relation to FIG. 2, the overall performance of the GPS receiver can be greatly improved.

It should be appreciated that the invention is not restricted to the details of the foregoing embodiment. For example, the control signal to be delivered to the GPS receiver need not necessarily be derived by means of a motion sensor of the type described above. For example, if the mobile terminal comprises a mobile phone, a real, or virtual, user interface can be employed so that the user can readily provide an appropriate input signal to the GPS receiver indicating that a particular movement characteristic is currently being exhibited. Also, the control signal could be issued by a remote device which itself senses a particular movement characteristic of the GPS receiver and then transmits a control signal to the receiver so as to alter the mode of signal processing in the manner such as that described above. A further example might include an information beacon on public transport wirelessly transmitting data relating to the movement characteristics of that transport, for example its speed or velocity, to nearby GPS receivers located on that transport.

In relation to the aspect of the present invention concerning narrowing the ranging of frequencies swept during signal acquisition as a function of the speed, with addition direction information (i.e. velocity information), this uncertainty can be further minimised. It should be noted that other frequency uncertainties are present during signal acquisition which can be significant and may impinge on the benefit derived from this aspect of the present invention. For instance, without up to date ephemeris data the receiver will be unable to quantify the motion of the satellites and hence fully quantify the Doppler expected to be observed, and also there will be further uncertainty as to the exact frequency the GPS receiver is sweeping due to inaccuracies in the local oscillator of the GPS receiver. However, these additional frequencies uncertainties may be minimised by the provision of assistance to the receiver in the form of up to date satellite almanac, ephemeris data and/or Doppler information for the satellites in view, and also a precision carrier frequency reference signal for calibrating the local oscillator used in the GPS receiver. With such assistance, it is possible to sweep a further narrowed range of frequencies and code phases in which the target PRN code is known to occupy, thereby reducing the number of code instances that need to be checked and this reducing the time for code acquisition. This assistance is further described in U.S. Pat. Nos. 5,841, 396 and 5,874,914 which are incorporated herein by reference.

The invention claimed is:

1. A method of receiving a spread spectrum signal at a mobile terminal, including the steps of:
    processing the spread spectrum signal for the purposes of signal acquisition and signal tracking,
    monitoring a movement of the mobile terminal:
    deriving a signal indicative of a characteristic of the movement of the mobile terminal; and
    changing a mode of processing of the spread spectrum signal by narrowing a ranging of frequencies swept during signal acquisition in response to the signal indicative of the characteristic of the movement of the mobile terminal.

2. A method as claimed in claim 1, wherein the characteristic of movement of the mobile terminal comprises an acceleration/deceleration characteristic.

3. A method as claimed in claim 1, wherein the characteristic of movement comprises a speed component.

4. A method as claimed in claim 1, wherein the characteristic of the movement comprises the mobile terminal being in a stationary state.

5. A method as claimed in claim 1, wherein the step of changing the mode of processing of the spread spectrum signal comprises switching signal tracking loops within the mobile terminal.

6. A method as claimed in claim 1, wherein the step of changing the mode of processing of the spread spectrum signal comprises increasing the integration time employed within an integrator within the mobile terminal.

7. A method as claimed in claim 1, wherein the step of changing the mode of processing of the spread spectrum signal comprises taking a snapshot of the spread spectrum signal only when either the speed or acceleration of the mobile terminal is below a predetermined threshold.

8. A spread spectrum receiver for receiving a spread spectrum signal at a mobile terminal comprising:
    means for processing the spread spectrum signal for the purpose of signal acquisition and signal tracking;
    means for monitoring a movement of the mobile terminal;
    deriving a signal indicative of a characteristic of the movement of the mobile terminal; and
    means for changing a mode of processing of the spread spectrum signal by narrowing a ranging of frequencies swept during signal acquisition in response to the signal indicative of the characteristic of the movement of the mobile terminal.

9. A receiver as claimed in claim 8, wherein the characteristic of movement of the mobile terminal comprises an acceleration/deceleration characteristic.

10. A receiver as claimed in claim 8, wherein the characteristic of movement comprises a speed component.

11. A receiver as claimed in claim 8, wherein the characteristic of the movement comprises the mobile terminal being in a stationary state.

12. A receiver as claimed in claim 8, wherein the step of changing the mode of processing of the incoming spread spectrum signal comprises switching signal tracking loops within the mobile terminal.

13. A receiver as claimed in claim 8, wherein the step of changing the mode of processing of the spread spectrum signal comprises increasing the integration time employed within an integrator within the mobile terminal.

14. A receiver as claimed in claim 8, wherein the step of changing the mode of processing of the spread spectrum signal comprises taking a snapshot of the spread spectrum signal only when either the speed or acceleration of the mobile terminal is below a predetermined threshold.

* * * * *